(12) United States Patent
Krishnamurthi et al.

(10) Patent No.: US 8,974,933 B2
(45) Date of Patent: Mar. 10, 2015

(54) METHOD AND APPARATUS FOR PREVENTING ELECTROLYSIS ON BATTERY CONTACTS IN A DUAL-CONTACT BATTERY SYSTEM

(75) Inventors: Macwien Krishnamurthi, Selangor (MY); Jauhari Abd Ghafar, Penang (MY); Kow Chee Chong, Penang (MY); John E. Herrmann, Suwanee, GA (US); Michael T F Loh, Penang (MY); Poh Huat Low, Penang (MY); Mark J. Terranova, Algonquin, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1028 days.

(21) Appl. No.: 12/869,881

(22) Filed: Aug. 27, 2010

(65) Prior Publication Data
US 2012/0052337 A1    Mar. 1, 2012

(51) Int. Cl.
*H01M 8/04* (2006.01)
*H01M 10/44* (2006.01)
*H01M 10/42* (2006.01)

(52) U.S. Cl.
CPC ........ *H01M 10/448* (2013.01); *H01M 10/4285* (2013.01)
USPC .............................................. 429/65; 429/61

(58) Field of Classification Search
USPC ......... 429/65, 61, 50; 361/750, 767; 174/262; 228/9, 165
See application file for complete search history.

(56) References Cited

U.S. PATENT DOCUMENTS

| 5,471,128 | A | 11/1995 | Patino et al. |
| 5,708,351 | A * | 1/1998 | Takamoro ...................... 307/150 |
| 5,716,725 | A * | 2/1998 | Riveron et al. ..................... 429/1 |
| 2008/0146188 | A1* | 6/2008 | Herrera ...................... 455/343.1 |
| 2010/0164474 | A1 | 7/2010 | Oglesbee et al. |
| 2010/0190052 | A1* | 7/2010 | Rajani et al. .................. 429/178 |

* cited by examiner

*Primary Examiner* — Cynthia H Kelly
*Assistant Examiner* — Monique Wills
(74) *Attorney, Agent, or Firm* — Barbara R. Doutre

(57) ABSTRACT

A dual-contact battery pack comprises a housing, a plurality of battery cells located within the housing, a first set of contacts and a second set of contacts coupled to the housing and to the plurality of battery cells. The dual-contact battery further comprises a first control circuit coupled between the plurality of battery cells and the first set of contacts and a second control circuit coupled between the plurality of battery cells and the second set of contacts. The first and second sets of contacts enable the dual-contact battery pack to selectively switch from a first state which prevents current from flowing from the plurality of battery cells to the respective first and second set of contacts to a second state in which current flows from the plurality of battery cells to the respective first and second set of contacts in response to the respective first and second control circuits.

18 Claims, 7 Drawing Sheets

US 8,974,933 B2

METHOD AND APPARATUS FOR PREVENTING ELECTROLYSIS ON BATTERY CONTACTS IN A DUAL-CONTACT BATTERY SYSTEM

FIELD OF THE DISCLOSURE

The present disclosure relates generally to dual-contact battery systems and more specifically to a dual-contact battery system and method for preventing electrolysis on the battery contacts of the dual-contact battery system.

BACKGROUND

Due to rapid advances in technology, there is an ever increasing number of different portable communication devices used in a variety of environmental conditions. Since most portable communication devices typically use a battery pack for operation, the number of battery packs that are manufactured must be the same as the number of portable communication devices. In order to reduce the need for many battery packs and further to improve logistics, a single battery pack with two contact sets can be used to support two different portable communication devices with different radio contact locations. The use of the battery pack with two contact sets also reduces the number of battery packs to half, thereby improving logistics. However, in such battery packs, the power is present at both the contact sets of the battery packs even when the contact sets are not engaged with the portable communication device. In such cases, if the contact sets that are not engaged with the portable communication devices become exposed to ionic liquids, there exists a possibility of corrosion resulting from electrolysis on these unused contact sets of the battery packs. Electrolysis is a process of accelerated corrosion resulting from an electric current within a metal in an electrolytic environment.

One approach to prevent electrolysis on the unused contact set is to provide water sealing for the exposed unused contact set. However, the water sealing approach uses physical mechanisms to cover the exposed unused contact set causing the battery contact set to cover a large area of the portable communication device thus increasing the size of the portable communication device. Therefore, there exists a need for preventing electrolysis at the unused contact set of the battery pack that does not require the use of any physical mechanism to cover the unused contact sets.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
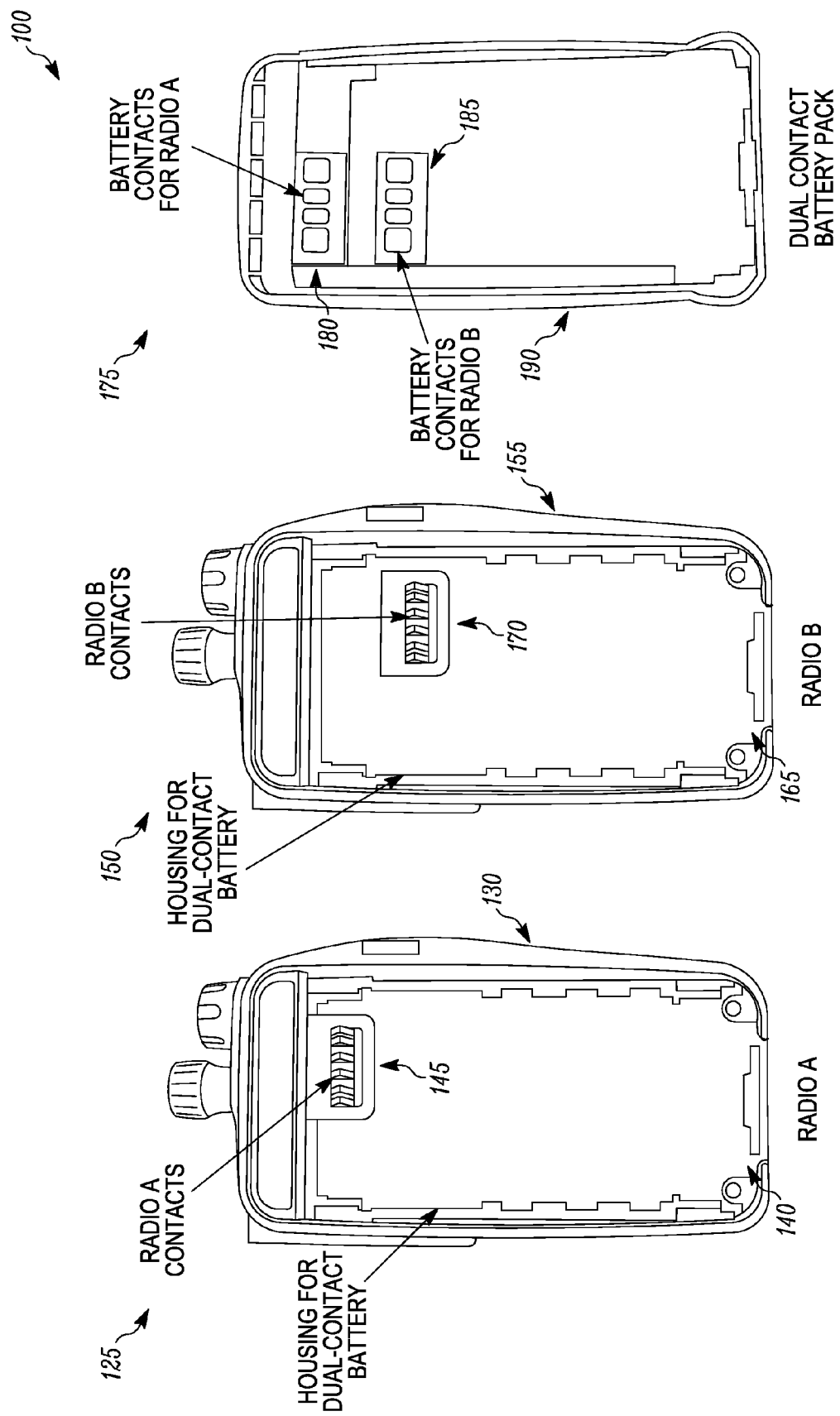
FIG. 1 shows a dual contact battery system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before describing in detail embodiments that are in accordance with the present invention, it should be observed that the embodiments reside primarily in combinations of method, steps and components related to preventing electrolysis on battery contacts in a dual-contact battery system having a dual-contact battery pack. The dual-contact battery pack comprises a housing, a plurality of battery cells located within the housing, a first set of contacts coupled to the housing and to the plurality of battery cells, and a second set of contacts coupled to a different location on the housing and to the plurality of battery cells. The dual-contact battery pack further comprises a first control circuit coupled between the plurality of battery cells and the first set of contacts and a second control circuit coupled between the plurality of battery cells and the second set of contacts. The first and second sets of contacts enable the dual-contact battery pack to selectively switch from a first state which prevents current from flowing from the plurality of battery cells to the respective first and second set of contacts to a second state in which current flows from the plurality of battery cells to the respective first and second set of contacts in response to the respective first and second control circuits.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

FIG. 1 shows a dual-contact battery system 100 having a dual-contact battery pack 175 for coupling to portable electronic devices 125 and 150 in accordance with some embodiments. Portable electronic devices 125 and 150 may comprise for example, a portable radio, a portable computer, or any other transportable electronic device powered from a rechargeable battery. For the purposes of this application, the dual-contact battery pack 175 for powering portable electronic devices 125 and 150 will be described in terms of portable radios 130 and 155 respectively having electronics enclosed therein. Portable radios 130 and 155 will sometimes be shown and/or described as Radio A and Radio B respectively. In accordance with one embodiment, each of the portable radios 130 and 155 comprises an antenna (represented as 135 and 160 in FIG. 1) and a controller section (not shown). The controller section of each of the portable radios 130 and 155 includes a microprocessor and may further include a memory device which contains data capable of being accessed. The memory device is preprogrammed by the manufacturer to include a number of different operating parameters and/or operating characteristics for the overall operation of the portable radios 130 and 155.

The dual-contact battery pack 175 is removably coupled to the portable radios 130 and 155. Two sets of contacts 180 and 185 of the dual-contact battery pack 175 provide power to two different portable radios 130 and 155. The two sets of contacts 180 and 185 in the dual-contact battery pack 175 provide electrical contact with corresponding radio contacts 145 and 170 of the portable radios 130 and 155 respectively.

Each of the portable radios 130 and 155 includes a housing (140, 165) for the dual-contact battery pack 175 in order to facilitate coupling of the dual-contact battery pack 175 with each of the portable radios 130 and 155. As shown in FIG. 1, the portable radio 130 includes a housing 140 for the dual-contact battery pack 175 and the portable radio 155 includes a housing 165 for the dual-contact battery pack 175. The housing for each of the portable radios 130 and 155 includes a set of radio contacts 145 and 170 that engages with the corresponding set of contacts 180 and 185 on the dual-contact battery back 175 to receive power. In particular, the housing 140 of the portable radio 130 includes a set of radio contacts 145 that engages with and receives power from the corresponding first set of contacts 180 of the dual-contact battery pack 175. Similarly, the housing 165 of the portable radio 155 includes a set of radio contacts 170 that engages with and receives power from the corresponding second set of contacts 185 of the dual-contact battery pack 175. In accordance with some embodiments, the location of the set of radio contacts 145 within the housing 140 of the portable radio 130 is different from the location of the set of radio contacts 170 within the housing 165 of the portable radio 155. The set of radio contacts 145 of the portable radio 130 and the set of radio contacts 170 of the portable radio 155 include a positive contact, a data contact, a select interface contact, and a negative contact. In accordance with some embodiments, the select interface contact and the negative contact of each of the portable radios 130 and 155 are set to ground (not shown).

Figure 2:
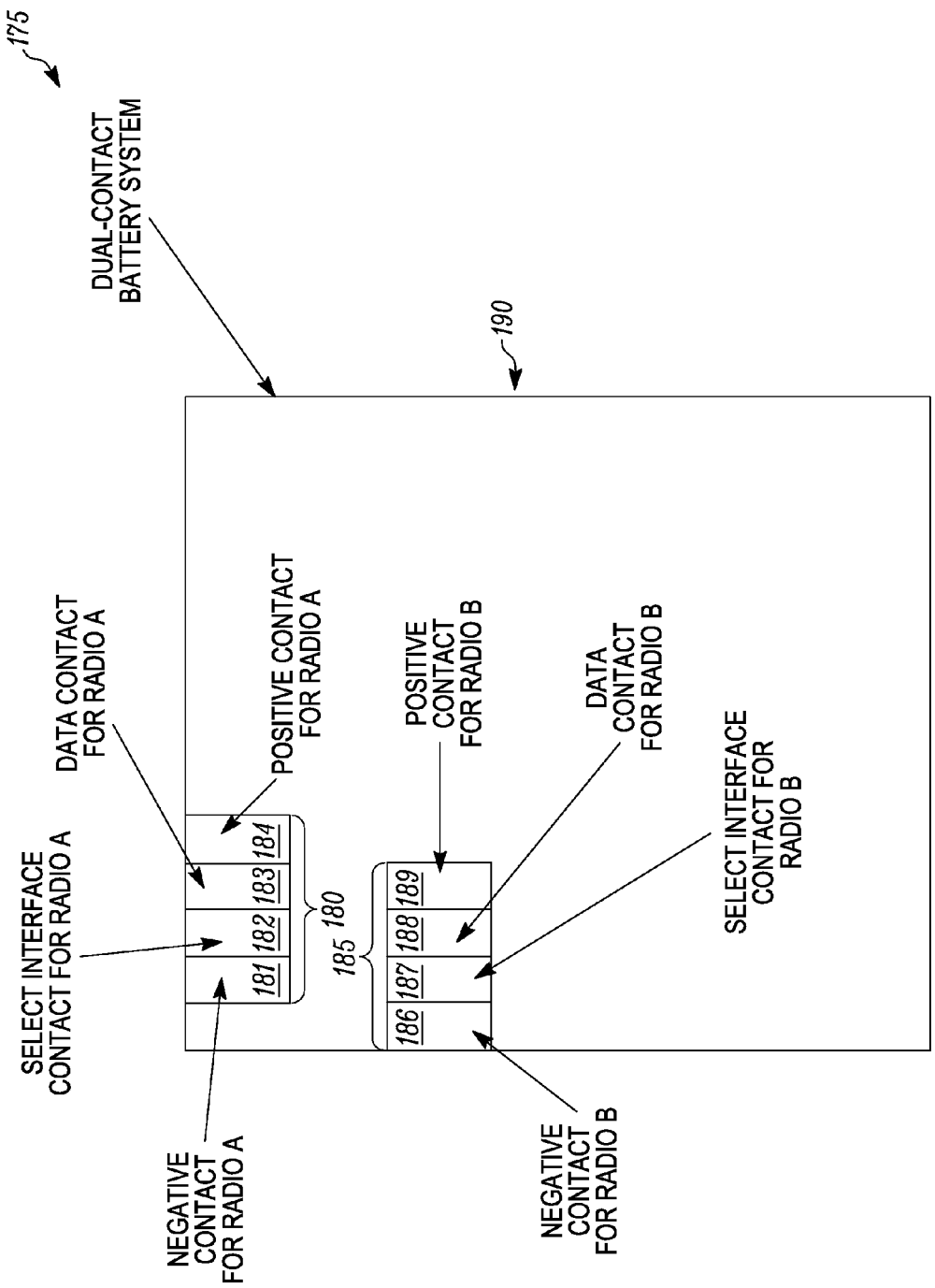
FIG. 2 is magnified view of a dual-contact battery pack in accordance with some embodiments.

FIG. 2 shows a magnified view of the two sets of contacts 180 and 185 in the dual-contact battery pack 175. The two sets of contacts 180 and 185 are disposed on a housing 190 of the dual-contact battery pack 175 for providing power to two portable radios 130 and 155 respectively. In accordance with some embodiments, the first set of contacts 180 and the second set of contacts 185 are positioned on different locations of the housing 190 of the dual-contact battery pack 175. The first set of contacts 180 includes four contacts namely a negative contact 181, a select interface contact 182, a data contact 183, and a positive contact 184 for providing electrical contact with corresponding radio contacts 145 of the portable radio 130. Similarly, the second set of contacts 185 includes four contacts namely a negative contact 186, a select interface contact 187, a data contact 188, and a positive contact 189 for providing electrical contact with corresponding radio contacts 170 of the portable radio 155. Electrical and mechanical coupling occur upon the battery pack's first set of contacts 180 engaging with the portable radio 130; and the battery pack's second set of contacts 185 engaging with the portable radio 155 respectively.

The negative contact 181 and the positive contact 184 of the first set of contacts 180 of the dual-contact battery pack 175 channel power to the portable radio 130 via the negative contact and the positive contact of the portable radio 130. Similarly, the negative contact 186 and the positive contact 189 of the second set of contacts 185 of the dual-contact battery pack 175 channel power to the portable radio 155 via the negative contact and the positive contact of the portable radio 155. Further, the data contact 183 of the dual-contact battery pack 175 establishes data communication between the dual-contact battery pack 175 and the portable radio 130 via the data contact of the portable radio 130. Similarly, the data contact 188 of the dual-contact battery pack 175 establishes data communication between the dual-contact battery pack 175 and the portable radio 155 via the data contact of the portable radio 155.

In accordance with an embodiment, when the select interface contact 182 engages with the select interface contact of the portable radio 130 that is set to ground, the select interface contact 182 of the dual-contact battery pack 175 also becomes grounded thereby allowing power to appear at the positive contact 184 of the dual-contact battery pack 175. Similarly, when the select interface contact 187 engages with the select interface contact of the portable radio 155 that is set to ground, the select interface contact 187 of the dual-contact battery pack 175 also becomes grounded, thereby allowing power to appear at the positive contact 189 of the dual-contact battery pack 175.

Figure 3A:
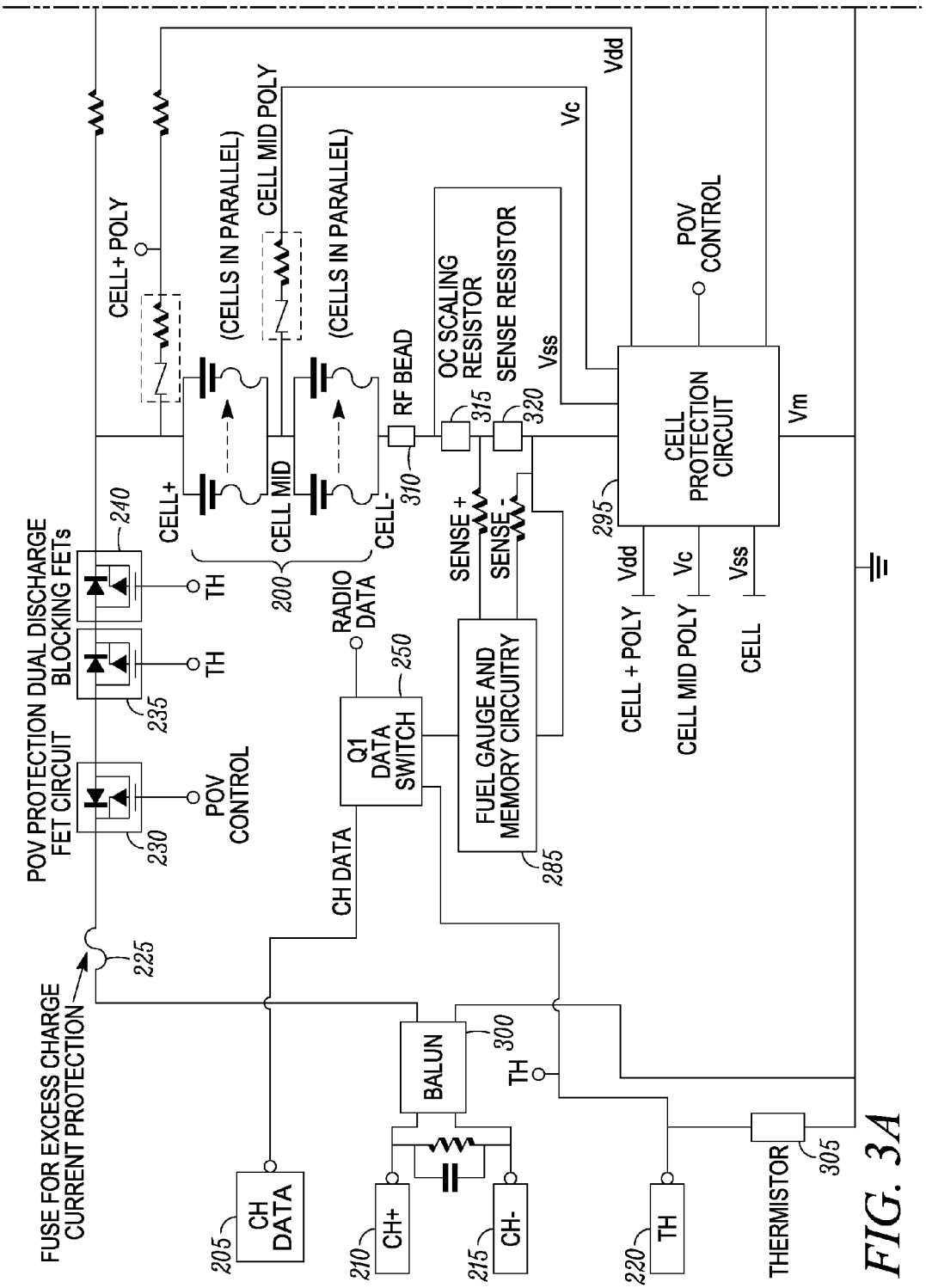
FIG. 3A shows a block diagram of a first portion of a dual-contact battery pack in accordance with some embodiments.
Figure 3B:
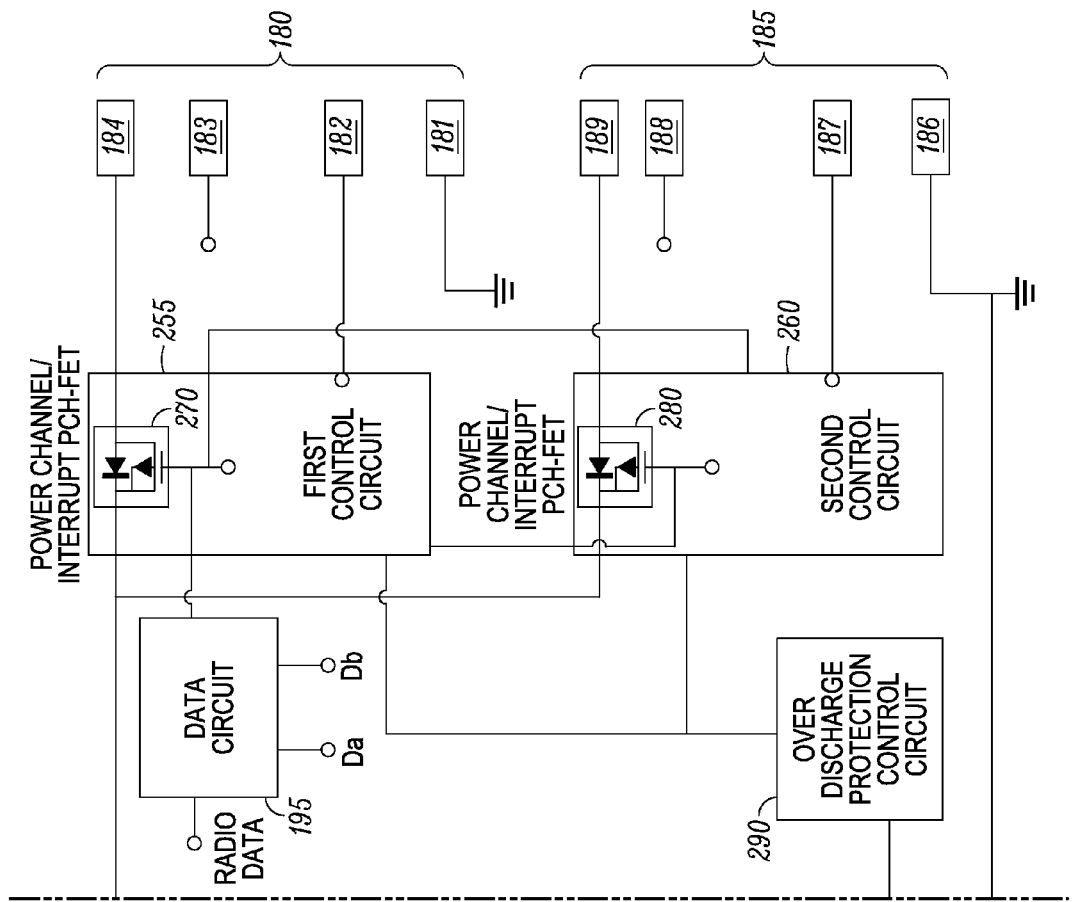
FIG. 3B shows a block diagram of a second portion of the dual-contact battery pack in accordance with some embodiments.

FIGS. 3A and 3B show block diagrams of a first portion and a second portion, respectively of the dual-contact battery pack 175 in accordance with some embodiments. The first portion of the dual-contact battery pack 175 (as shown in FIG. 3A) includes a plurality of battery cells 200 having battery terminals (not shown), such as Nickel, Nickel-Cadmium, or Lithium ion chemistries to name a few. In accordance with one embodiment, the dual-contact battery pack 175 using Lithium ion cells (two 3.7V nominal voltage cells) are connected in series to provide 7.4V DC nominal voltage. Alternatively, nickel (Ni) based batteries (six 1.2V nominal voltage cells) could also be used. Further, cells are connected in parallel in order to increase the capacity of battery cells 200.

Referring to FIG. 3A, the first portion of the dual-contact battery pack 175 further includes charging interconnect terminals (namely 205, 210, 215, and 220) for coupling the dual-contact battery pack 175 to a charger. The charging interconnect terminals includes positive charge terminal (CH$^+$) 210, thermistor terminal (TH) 220, charge data (CH data) terminal 205, and negative charge terminal (CH$^-$) 215. The thermistor terminal (TH) 220 is coupled to a thermistor 305 which is further connected to ground. The thermistor 305 senses the temperature of the plurality of battery cells 200 and feedbacks the respective voltages to the charger such that the charging of the plurality of battery cells 200 is controlled between the temperature of zero (0) degrees Celsius to forty five (45) degrees Celsius. The dual-contact battery pack 175 includes a balun 300 coupled to the positive charge terminal (CH$^+$) 210 and the negative charge terminal (CH$^-$) 215. The balun 300 blocks stray radio frequency (RF) energy from the internal dual-contact battery pack 175 to the charging interconnect terminals on the housing 190 of the dual-contact battery pack 175. The use of balun 300 ensures that a user's palm while handling any of the portable radios 130 and 155 connected to the dual-contact battery pack 175 is protected from the RF energy of the dual-contact battery pack 175. The balun 300 is coupled to a fuse 225 for excess charge current protection. The fuse 225 is selected with a predetermined rating, such as for example a three ampere (3 A) slow blow fuse. The purpose of the fuse 225 is to protect the plurality of battery cells 200 from over charging in case a non-compatible battery charger is used to charge the dual-contact battery pack 175. The fuse 225 is coupled to a field effect transistor (FET) 230 that acts as a primary overvoltage (POV) protection device. The POV protection FET 230 is further coupled to dual-discharge blocking FETs 235 and 240 and a cell protection circuit 295. The FETs 235 and 240 are used to prevent current from flowing out of the plurality of battery cells 200 to the positive charge terminal (CH$^+$) 210 and the negative charge terminal (CH$^-$) 215, thereby providing short circuit protection at the charging interconnect terminals.

Referring to FIG. 3B, the second portion of the dual-contact battery pack 175 includes two sets of contacts 180 and 185, two control circuitries represented as 255 and 260, and a data circuit 195 formed in accordance with some embodiments. In accordance with some embodiments, the two control circuitries 255 and 260 are coupled between the plurality of battery cells 200 (shown in FIG. 3A) and the two sets of contacts 180 and 185. Specifically, the first control circuit 255 is coupled between the plurality of battery cells 200 and the first set of contacts 180 via the battery terminals. Similarly, the second control circuit 260 is coupled between the plurality of battery cells 200 and the second set of contacts 185 via the battery terminals. The two sets of contacts 180 and 185 are either enabled or disabled in response to input received from the corresponding portable radio 130 and 155 over the corresponding select interface contacts 182 and 187 of the dual-contact battery pack 175.

In accordance with some embodiments, as shown in FIG. 3B, the dual-contact battery pack 175 comprises an over discharge protection control circuit 290 coupled to the first control circuit 255 and the second control circuit 260. The over discharge protection control circuit 290 prevents the flow of current from the plurality of battery cells 200 (shown in FIG. 3A) to the charger when the charger is turned off. In operation, when the dual-contact battery pack 175 is connected to the charger and the charger is accidently turned on, an over discharge of the plurality of battery cells 200 might occur. Thus, in order to prevent the over discharge of the plurality of battery cells 200, the over discharge protection control circuit 290 is included in the dual-contact battery pack 175.

Further, a data switch 250 (shown in FIG. 3A) is coupled between the charge data terminal 205 and the data circuit 195 (shown in FIG. 3B) which is further connected to the data contacts 183 and 188 of the dual-contact battery pack 175. The thermistor terminal (TH) 220 is also coupled to a data switch 250. The data switch 250 establishes a data communication between the charger and the dual-contact battery pack 175 when the dual-contact battery pack 175 is connected to the charger. The data switch 250 further establishes a data communication between the dual-contact battery pack 175 and an electronic device when the electronic device is connected to the dual-contact battery pack 175. Since the dual-contact battery pack 175 includes two sets of contacts 180 and 185 (shown in FIG. 3B), the data circuit 195 switches the data communication from the data contact 183 of the first set of contacts 180 to the data contact 188 of the second set of contacts 185 when the second set of contacts 185 engages with the portable radio 155. Similarly, the data circuit 195 switches the data communication from the data contact 188 of the second set of contacts 185 to the data contact 183 of the first set of contacts 180 when the first set of contacts 180 engages with the portable radio 130. In accordance with some embodiments, the data circuit 195 is switched by default to the data contact 188 side of the second set of contacts 185.

The data switch 250 is also connected to a fuel gauge and memory circuitry 285. The fuel gauge and memory circuitry 285 is further coupled to the plurality of battery cells 200 through a sense resistor 320, an over current (OC) scaling resistor 315, and a RF bead 310. The RF bead 310 coupled to the plurality of battery cells 200 blocks any stray noise at the plurality of battery cells 200 from appearing at the sense resistor 320 and the OC scaling resistor 315. The RF bead 310 is further connected to the OC scaling resistor 315 that provides tight over discharge current range. The sense resistor 320 connected to the OC scaling resistor 315 helps in measuring tight tolerance voltage and current value so as to obtain an accurate result from the fuel gauge and memory circuitry 285.

The fuel gauge and memory circuitry 285 monitors a voltage drop across the sense resistor 320 connected in series with the plurality of battery cells 200 to determine charging, discharging fuel gauging activity of the plurality of battery cells 200. The sense resistor 320 is further coupled to the cell protection circuit 295 to prevent the plurality of battery cells 200 from fault conditions. The cell protection circuit 295 further includes an over discharge current circuit, an over voltage protection circuit, and an under voltage protection circuit (not shown). The over discharge current circuit terminates an excessive flow of discharge current from the dual-contact battery pack 175 when the first set of contact 180 and the second set of contacts 185 are short circuited beyond a predetermined current value. The over voltage protection circuit prevents charging of the plurality of the battery cells 200 when any cell from the plurality of the battery cells 200 exceeds a predetermined over voltage value. Similarly, the under voltage protection circuit is used to prevent discharging of the plurality of the battery cells 200 when any cell of the plurality of the battery cells 200 falls below a predetermined under voltage value.

Figure 4:
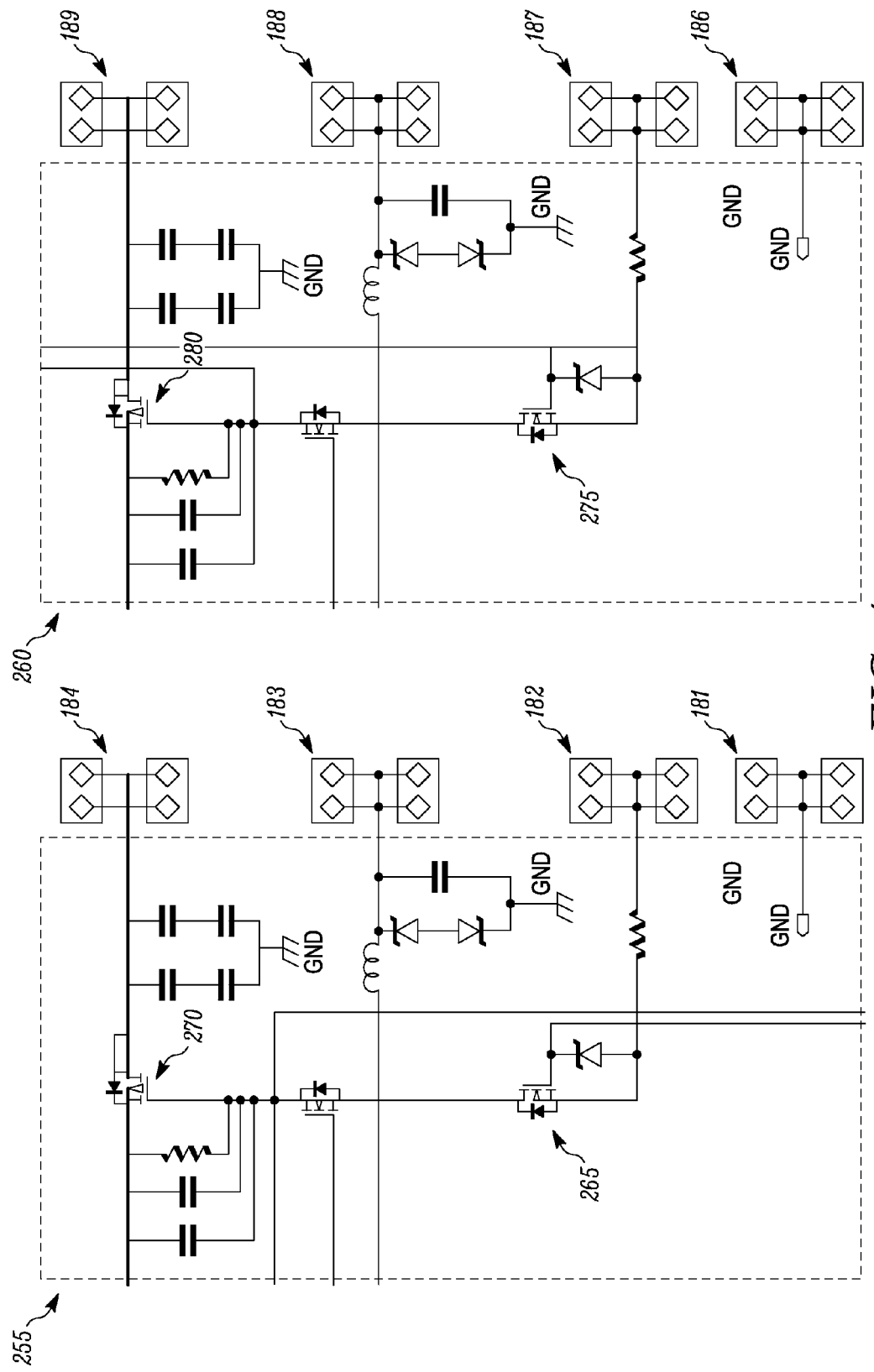
FIG. 4 is a schematic diagram of the first control circuit along with a first set of contacts and the second control circuit along with a second set of contacts in the dual-contact battery pack in accordance with some embodiments.

FIG. 4 shows a more detailed circuit diagram of the first control circuit 255 along with the first set of contacts 180 and the second control circuit 260 along with the second set of contacts 185. The interoperation of a P-channel FET 270 of the first control circuit 255 and a P-channel FET 280 of the second control circuit 260 are discussed with reference to both FIGS. 3B and 4.

Referring to FIG. 4, the first control circuit 255 coupled between the data circuit 195 and the select interface contact 182 includes an N-channel field effect transistor (FET) 265 and a P-channel FET 270. The first control circuit 255 is further coupled to the positive contact 184 of the first set of contacts 180 via the P-channel FET 270. Similarly, the second control circuit 260 is coupled between the data circuit 195 and the select interface contact 187 of the second set of contacts 185. The second control circuit includes an N-channel field effect transistor (FET) 275 and a P-channel FET 280. The second control circuit 260 is further coupled to the positive contact 189 of the second set of contacts 185 via the P-channel FET 280. Each of the P-channel FET 270, P-channel FET 280, N-channel FET 265, and N-channel FET 275 comprises a source terminal (S), a gate terminal (G), and a drain terminal (D). In accordance with some embodiments, the source terminal (S) of the P-channel FET 270 is coupled to the plurality of the battery cells 200, the drain terminal (D) of the P-channel FET 270 is coupled to the positive contact 184 of the first set of contacts 180, and the gate terminal (G) of the P-channel FET 270 is coupled to the select interface contact 182 of the first set of contacts 180 of the dual-contact battery pack 175. Similarly, the source terminal (S) of the P-channel FET 280 is coupled to the plurality of the battery cells 200, the drain terminal (D) of the P-channel FET 280 is coupled to the positive contact 189 of the second set of contacts 185, and the gate terminal (G) of the P-channel FET 280 is coupled to the select interface contact 187 of the second set of contacts 185 of the dual-contact battery pack 175.

In accordance with some embodiments, the dual-contact battery pack 175 is initially set to an OFF state. The OFF state of the dual-contact battery pack 175 represents a state in which neither portable radio 130 nor portable radio 155 is connected to the dual-contact battery pack 175. In such a case, the drain terminal (D) of the N-channel FET 265 in the first control circuit 255 and the N-channel FET 275 in the second control circuit 260 remains high. The high drain terminal (D) of the N-channel FET 265 and the N-channel FET 275 maintains the P-channel FET 270 and the P-channel FET 280 respectively in the OFF state. The OFF state of the P-channel FET 270 and the P-channel FET 280 ensures that no power appears on the first set of contacts 180 and the second set of contacts 185 respectively. Moreover, in accordance with some embodiments, in the OFF state, the data circuit 195 would switch the data by default to the data contact 188 of the second set of contacts 185 of the dual-contact battery pack 175 and no data is sent to the data contact 183 of the first set of contacts 180.

In accordance with some embodiments, when the portable radio 130 engages with the first set of the contacts 180 of the dual-contact battery pack 175, the select interface contact 182 is grounded due to its engagement with the grounded select interface contact of the portable radio 130. The grounding of the select interface contact 182 of the first set of contacts 180 turns the gate terminal (G) of the P-channel FET 270 to low, thereby switching ON the P-channel FET 270 in the first control circuit 255. The P-channel FET 270 when in the ON state closes its power path, thereby channeling power to the positive contact 184 of the first set of contacts 180. Also, as the drain terminal (D) of the N-channel FET 265 is pulled low, the data circuit switches the data from the data contact 188 of the second set of contacts 185 to the data contact 183 of the first set of contacts 180, hence establishing data communication between the dual-contact battery pack 175 and the portable radio 130. The first set of contacts 180 is thus switched from the OFF state in which no power appears at the first set of contacts 180 to an ON state in which power appears at the first set of contacts 180 of the dual-contact battery pack 175. In such a case, when the portable radio 130 is connected to the first set of contacts 180, no power appears on the positive contacts 189 of the second set of contacts 185 as the gate terminal (G) of the P-channel FET 280 in the second control circuit 260 is still tied to high, thereby opening its power path. Accordingly, the electrolysis is prevented on the second set of contacts 185 of the dual-contact battery pack 175 by not allowing the power to appear at the second set of contacts 185. In other words, the first set of contacts 180 enable the dual-contact battery pack 175 to selectively switch from the OFF state which prevents current from flowing from the plurality of battery cells 200 to the first set of contacts 180 to the ON state in which current flows from the plurality of battery cells 200 to the first set of contacts 180 in response to the first control circuit 255.

In accordance with some embodiments, when the portable radio 130 disengages with the first set of contacts 180 of the dual-contact battery pack 175, the gate terminal (G) of the P-channel FET 270 is turned high, thereby switching OFF the P-channel FET 270. The P-channel FET 270 in the OFF state prevents power to appear at the first set of contacts 180 of the dual-contact battery pack 175. In such cases, when the portable radio 130 disengages with the first set of contacts 180 of the dual-contact battery pack 175, the dual-contact battery pack 175 switches back to the OFF state.

Further, when the portable radio 155 engages with the second set of the contacts 185 of the dual-contact battery pack 175, the select interface contact 187 is grounded due to its engagement with the grounded select interface contact of the portable radio 155. The grounding of the select interface contact 187 of the second set of contacts 185 turns the gate terminal (G) of the P-channel FET 280 to low, thereby switching ON the P-channel FET 280 in the second control circuit 260. The P-channel FET 280 closes its power path in the ON state, thereby channeling power to the positive contact 189 of the second set of contacts 185. Also, as the drain terminal (D) of the N-channel FET 275 is pulled low, the data circuit switches the data from the data contact 183 of the first set of contacts 180 to the data contact 188 of the second set of contacts 185, hence establishing data communication between the dual-contact battery pack 175 and the portable radio 155. The first set of contacts 180 is thus switched from the OFF state in which no power appears at the first set of contacts 180 to an ON state in which power appears at the first set of contacts 180 of the dual-contact battery pack 175. In such a case, when the portable radio 155 is connected to the second set of contacts 185, no power appears on the positive contacts 184 of the first set of contacts 180 as the gate terminal (G) of the P-channel FET 270 in the second control circuit 260 is still tied to high, thereby opening its power path. Accordingly, electrolysis is prevented on the first set of contacts 180 of the dual-contact battery pack 175 by not allowing the power to appear at the first set of contacts 180. In other words, the second set of contacts 185 enable the dual-contact battery pack 175 to selectively switch from the OFF state which prevents current from flowing from the plurality of battery cells 200 to the second set of contacts 185 to the ON state in which current flows from the plurality of battery cells 200 to the second set of contacts 185 in response to the second control circuit 260.

In accordance with some embodiments, when the portable radio 155 disengages with the second set of contacts 185 of the dual-contact battery pack 175, the gate terminal (G) of the P-channel FET 280 is turned high, thereby switching OFF the P-channel FET 280. The P-channel FET 280 in the OFF state prevents power to appear at the second set of contacts 185 of the dual-contact battery pack 175. In such cases, when the portable radio 155 disengages with the second set of contacts 185 of the dual-contact battery pack 175, the dual-contact battery pack 175 switches back to the OFF state.

In accordance with some embodiments, when the dual-contact battery pack 175 is connected to the charger, the portable radios 130 and 155 would still be powered ON as usual. However, if there is no portable radio connected to the dual-contact battery during charging, then there would be no power on the first set of contacts 180 and the second set of contacts 185 of the dual-contact battery pack 175. Further, when the dual-contact battery pack 175 is connected to the charger, the data switch 250 would switch the data from the data circuit 195 side to the charger side.

Figure 5:
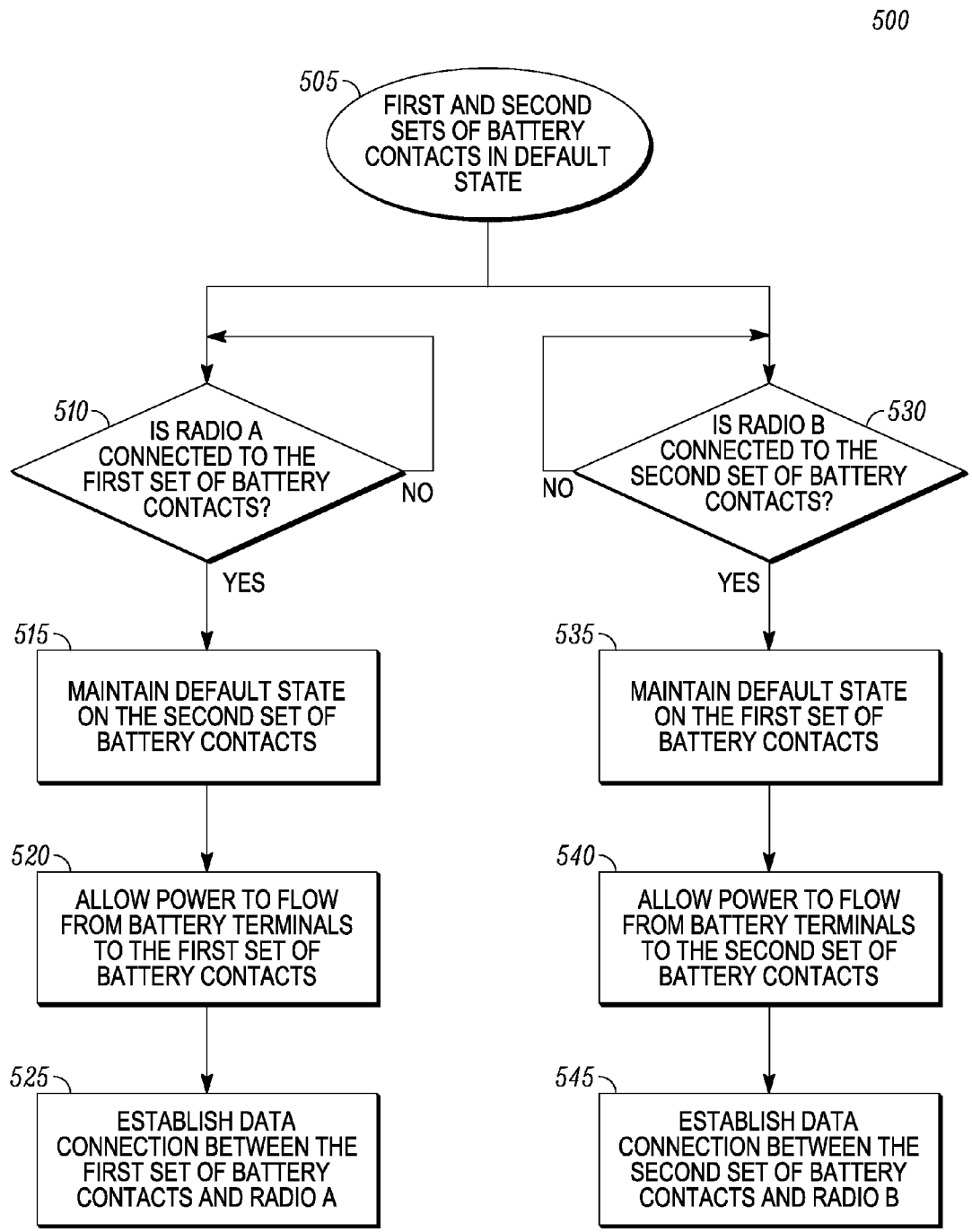
FIG. 5 is a flowchart showing a method to prevent electrolysis at the dual-contact battery pack in accordance with some embodiments.

In FIG. 5, a flowchart 500 showing a sequence to prevent electrolysis in the dual-contact battery pack 175 accordance with some embodiments is shown. In 505, both the first and the second set of contacts 180 and 185 of the dual-contact battery pack 175 are in a default state (OFF state) when neither portable radio 130 (Radio A) nor 155 (Radio B) is connected to the dual-contact battery pack 175. As described with reference to FIG. 3, the default state (OFF state) represents the state in which the P-channel FETs 270 and 280 are in the OFF state. In default state of the dual-contact battery pack 175, no power appears either at the first set of contacts or at the second set of contacts.

In 510, the dual-contact battery pack 175 detects whether the portable radio 130 (Radio A) is connected to the first set of contacts 180. When the dual-contact battery pack 175 detects that the portable radio 130 is connected to the first set of contacts 180, the dual-contact battery pack 175 maintains the second set of contacts 185 in the default state at 515 and allows the power to appear at the first set of contacts 180 in 520. Returning back to 510, when the dual-contact battery pack 175 detects that the portable radio 130 is not connected to the first set of contacts 180, the dual-contact battery pack 175 maintains the default state of 505 on both sets of contacts 180, 185 until the portable radio 130 is connected to the dual-contact battery pack 175. In accordance with some embodiments, the select contact and the negative contact of the portable radio 130 are set to the ground. The detection of the engagement of the portable radio 130 with the dual-contact battery pack 175 is detected when the select interface contact 182 engages with the grounded select interface contact of the portable radio 130. After the detection of the engagement of the portable radio 130 with the first set of contacts 180 of the dual-contact battery pack 175, the dual-contact battery pack 175 enables the power to appear at the first set of contacts 180 thus powering the engaged portable radio 130. In accordance with some embodiments, the select interface contact 182 of the first set of contacts 180, when grounded, switches ON the P-channel FET 270 (as shown in FIGS. 3B and 4) coupled to the positive contact 184 of the first set of the contacts 180 of the dual-contact battery pack. The P-channel FET 270, when in ON state, allows power to flow from the plurality of battery cells 200 to the positive contact 184 of the first set of contacts 180 of the dual-contact battery pack 175. Further, in 525, the data connection is also established between the dual-contact battery pack 175 and the portable radio 130. In accordance with some embodiment, the select interface contact 182 of the first set of contacts 180, when set to ground, switches the data to data contact 183 side by pulling the drain terminal (D) of N-channel FET 275 (shown in FIG. 4) to low.

In 530, the dual-contact battery pack 175 detects whether the portable radio 155 (Radio B) is connected to the second set of contacts 185. When the dual-contact battery pack 175 detects that the portable radio 155 is connected to the second set of contacts 180, the dual-contact battery pack 175 maintains the first set of contacts 180 in the default state at 535 and allows the power to appear at the second set of contacts 185 in 540. Returning back to 530, when the dual-contact battery pack 175 detects that the portable radio 155 is not connected to the second set of contacts 180, the dual-contact battery pack 175 maintains the default state of 505 on both sets of contacts 180, 185 until the portable radio 155 is connected to the dual-contact battery pack 175. In accordance with some embodiments, the select contact and the negative contact of the portable radio 155 are set to the ground. The detection of the engagement of the portable radio 155 with the dual-contact battery pack 175 is detected when the select interface contact 187 engages with the grounded select interface contact of the portable radio 155. After the detection of the engagement of the portable radio 155 with the second set of contacts 185 of the dual-contact battery pack 175, the dual-contact battery pack 175 enables the power to appear at the second set of contacts 185 thus powering the engaged portable radio 155. In accordance with some embodiments, the select interface contact 187 of the second set of contacts 185, when grounded, switches ON the P-channel FET 280 (as shown in FIGS. 3B and 4) coupled to the positive contact 189 of the second set of the contacts 185 of the dual-contact battery pack 175. The P-channel FET 280, when in ON state, allows power to flow from the plurality of battery cells 200 to the positive contact 189 of the second set of contacts 185 of the dual-contact battery pack 175. Further, in 545, the data connection is also established between the dual-contact battery pack 175 and the portable radio 155. In accordance with some embodiment, the select interface contact 187 of the second set of contacts 185, when set to ground, switches the data to data contact 188 side by pulling the drain terminal (D) of N-channel FET 275 (shown in FIG. 4) to low.

Figure 6:
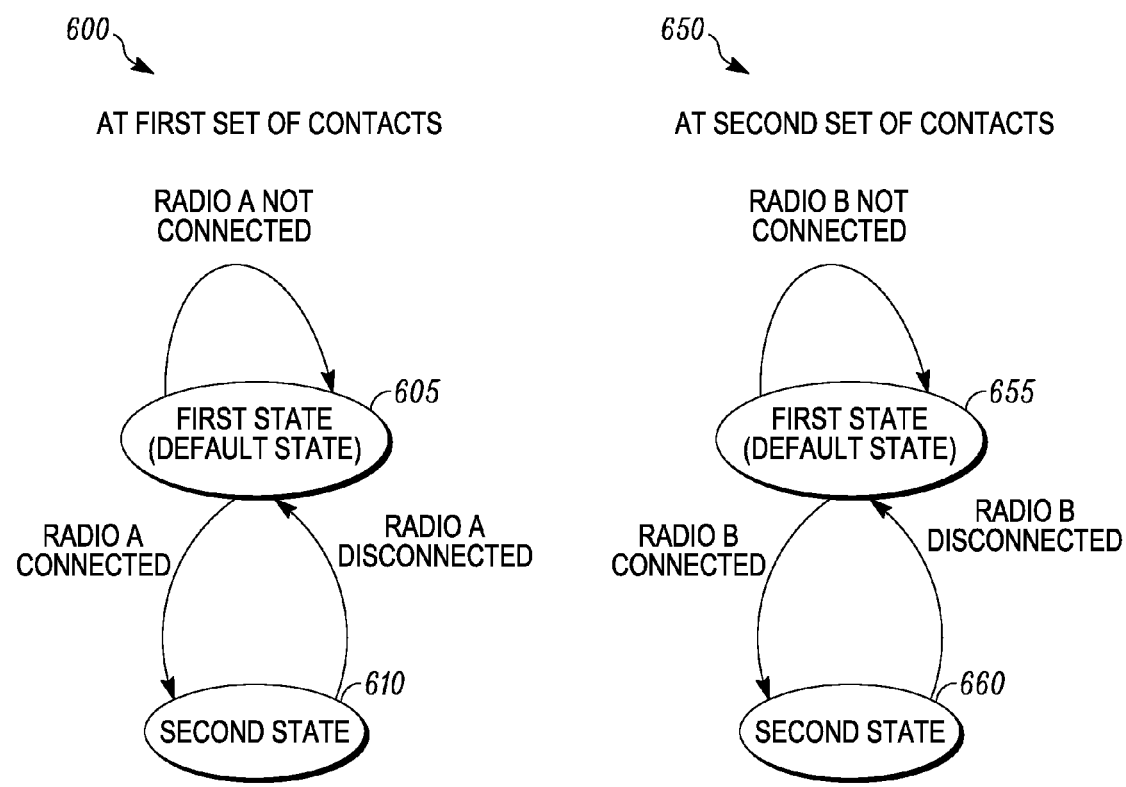
FIG. 6 is a state diagram representing different states of the first set of contacts and the second set of contacts of the dual-contact battery pack in accordance with some embodiments.

FIG. 6 shows two state diagrams 600 and 650 representing the different states of the first set of contacts 180 and the second set of contacts 185 respectively of the dual-contact battery pack 175. The state diagram 600 shows two different states 605 and 610 of the first set of contacts 180. The first state 605 of the first set of contacts 180 represent a default state of the first set of contacts 180. The default state of the dual-contact battery pack 175 represents the state in which no power appears at the first set of contacts 180 of the dual-contact battery pack 175. In the default state, the portable radio 130 is not connected to the first set of contacts 180 of the dual-contact battery pack 175. The first set of contacts 180 are initially in its first state 605 and remains in the default state until the portable radio 130 is connected to the first set of contacts 180. When the portable radio 130 engages with the first set of contacts 180 of the dual-contact battery pack 175, the first set of contacts switches from the first state 605 to a second state 610. The second state 610 represents the state in which the power appears on the first set of contacts 180 of the dual-contact battery pack 175. The first set of contacts 180 remains in the second state 610 until the portable radio 130 is disconnected from the dual-contact battery pack 175. In accordance with some embodiments, when the portable radio 130 disengages with the first set of contacts 180 of the dual-contact battery pack 175, the first set of contacts 180 switches from the second state 610 in which the power appears at the first set of the contacts 180 to the first state 605 in which no power appears at the first set of contacts 180.

The state diagram 650 shows two different states 655 and 660 of the second set of contacts 185. The first state 655 of the second set of contacts 185 represent the default state of the second set of contacts 185. The default state of the dual-contact battery pack represents the state in which no power appears at the second set of contacts 185 of the dual-contact battery pack 175. In the default state, the portable radio 155 is not connected to the second set of contacts 185 of the dual-contact battery pack 175. The second set of contacts 185 is initially in its first state 655 and remains in the default state until the portable radio 155 is connected to the second set of contacts 185. When the portable radio 155 engages with the second set of contacts 185 of the dual-contact battery pack 175, the second set of contacts 185 switches from the first state 655 to a second state 660. The second state 660 represents the state in which the power appears on the second set of contacts 185 of the dual-contact battery pack 175. The second set of contacts 185 remains in the second state 660 until the portable radio 155 is disconnected from the dual-contact battery pack 175. In accordance with some embodiments, when the portable radio 155 disengages with the second set of contacts 185 of the dual-contact battery pack 175, the second set of contacts 185 switches from the second state 660 in which the power appears at the second set of the contacts 185 to the first state 655 in which no power appears at the second set of contacts 180.

The additional control circuits formed and operating in accordance with the various embodiments prevent corrosion on the unused battery pack contacts even when the contacts are left exposed. The prevention of electrolysis has been achieved without the use of external mechanical piece parts. Thus, the damage caused to the battery contacts as a result of corrosion can now be prevented by using a dual-contact battery system formed and operating in accordance with various embodiments of this invention.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized controllers (or "controlling devices") such as microcontroller, customized controllers and unique stored program instructions (including both software and firmware) that control the one or more controllers to implement, in conjunction with certain non-controller circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject Those skilled in the art will appreciate that the above recognized advantages and other advantages described herein are merely exemplary and are not meant to be a complete rendering of all of the advantages of the various embodiments of the present invention.

The invention claimed is:

1. A battery pack, comprising:
   a housing;
   a plurality of battery cells located within the housing;
   a first set of contacts coupled to the housing and to the plurality of battery cells;
   a second set of contacts coupled to a different location on the housing and to the plurality of battery cells;
   a first control circuit coupled between the plurality of battery cells and the first set of contacts;
   a second control circuit coupled between the plurality of battery cells and the second set of contacts;
   the first set of contacts configured to to selectively switch the battery pack was added from a first state which prevents current from flowing from the plurality of battery cells to the first set of contacts to a second state in which current flows from the plurality of battery cells to the first set of contacts in response to the first control circuit; and
   the second set of contacts configured to to selectively switch the battery pack from a first state which prevents current from flowing from the plurality of battery cells to the second set of contacts to a second state in which current flows from the plurality of battery cells to the second set of contacts in response to the second control circuit.

2. The battery pack of claim 1, wherein each of the first set of contacts and the second set of contacts comprises: a positive contact, a data contact, a select interface contact, and a negative contact.

3. The battery pack of claim 2, wherein the positive contact and the negative contact corresponding to the first set of contacts channel power to a first electronic device, and the data contact corresponding to the first set of contacts establishes data communication between the battery pack and the first electronic device.

4. The battery pack of claim 2, wherein the positive contact and the negative contact corresponding to the second set of contacts channel power to a second electronic device, and the data contact corresponding to the second set of contacts establishes data communication between the battery pack and the second electronic device.

5. The battery pack of claim 2, further comprising:
   a data circuit coupled to the first and second control circuits, wherein the select interface contact corresponding to the first set of contacts causes the data circuit to enable data to flow to the data contact corresponding to the first set of contacts when the select interface engages with a corresponding contact on a first electronic device, and further wherein the select interface contact corresponding to the second set of contacts causes the data circuit to enable data to flow to the data contact corresponding to the second set of contacts when the select interface engages with a corresponding contact on a second electronic device.

6. The battery pack of claim 5, wherein each of the first and second control circuits comprises a first P-channel field effect transistor (FET) and a second P-channel FET, respectively to selectively power the first and the second electronic device.

7. The battery pack of claim 6, wherein the first and second P-channel FETs comprise source, gate, and drain terminals, and further wherein the source terminal is coupled to the plurality of battery cells, the drain terminal is coupled to a corresponding positive contact of the first and second set of contacts, and the gate terminal is coupled to a corresponding select interface contact of the first and second set of contacts.

8. The battery pack of claim 1, further comprising an over discharge protection control circuit coupled to the first control circuit and the second control circuit.

9. A dual-contact battery system comprising:
a plurality of battery cells having a battery terminal;
a first set of battery contacts and a second set of battery contacts each coupled to the battery terminal, the first set of battery contacts and the second set of battery contacts for channeling power to a first electronic device and a second electronic device, respectively, wherein each of the first and second sets of battery contacts comprises a select interface contact;
a first control circuit coupled between the battery terminal and the first set of battery contacts, wherein the select interface contact corresponds to the first set of battery contacts and causes the first control circuit to switch from a first state which prevents current from flowing from the battery terminal to the first set of battery contacts to a second state in which current flows from the battery terminal to the first set of battery contacts when the select interface contact engages with a corresponding contact on the first electronic device; and
a second control circuit coupled between the battery terminal and the second set of battery contacts, wherein the select interface contact corresponding to the second set of battery contacts causes the second control circuit to switch from a first state which prevents current from flowing from the battery terminal to the second set of battery contacts to a second state in which current flows from the battery terminal to the second set of battery contacts when the select interface contact engages with a corresponding contact on the second electronic device.

10. The dual-contact battery system as claimed in claim 9, wherein each of the first and second sets of battery contacts further comprises a positive contact and a negative contact for channeling power to the first electronic device and the second electronic device, respectively.

11. The dual-contact battery system as claimed in claim 9, wherein each of the first and second set of battery contacts further comprises a data contact for establishing data communication between the dual-contact battery system and the first and second electronic devices, respectively.

12. The dual-contact battery system as claimed in claim 11, further comprising:
a data circuit coupled to the first and second control circuits, wherein the select interface contact corresponding to the first set of battery contacts causes the data circuit to enable data to flow to the data contact corresponding to the first set of battery contacts when the select interface engages with the corresponding contact on the first electronic device, and further wherein the select interface contact corresponding to the second set of battery contacts causes the data circuit to enable data to flow to the data contact corresponding to the second set of battery contacts when the select interface engages with the corresponding contact on the second electronic device.

13. The dual-contact battery system as claimed in claim 9, wherein each of the first and second control circuits comprises a first P-channel field effect transistor (FET) and a second P-channel FET, respectively to cause the corresponding switching from the first state to the second state.

14. The dual-contact battery system as claimed in claim 13, wherein the first and second P-channel FETs comprise source, gate, and drain terminals, and further wherein the source terminal is coupled to the plurality of battery cells, the drain terminal is coupled to a corresponding positive contact of the first and second set of battery contacts, and the gate terminal is coupled to a corresponding select interface contact of the first and second set of battery contacts.

15. The dual-contact battery system as claimed in claim 9, further comprising an over discharge protection control circuit coupled to the first control circuit and the second control circuit.

16. The battery pack of claim 1, wherein the first set of contacts enables the battery pack to selectively switch from the first state to the second state based on an engagement of the first set of contacts with a first electronic device, and the second set of contacts enables the battery pack to selectively switch from the first state to the second state based on an engagement of the second set of contacts with a second electronic device.

17. The battery pack of claim 1, wherein the first control circuit controlling of current during the first and second states prevents electrolysis on unused contacts of the first set of contacts and the second control circuit controlling of current during the first and second states prevents electrolysis on unused contacts of the second set of contacts.

18. The dual-contact battery system of claim 9, wherein the first and second control circuits controlling of current during the first and second states prevents electrolysis on unused contacts of the first and second battery contacts.

* * * * *